June 11, 1957
R. L. LOWE
2,795,457
AUXILIARY VISOR FOR VEHICLES
Filed Jan. 26, 1955
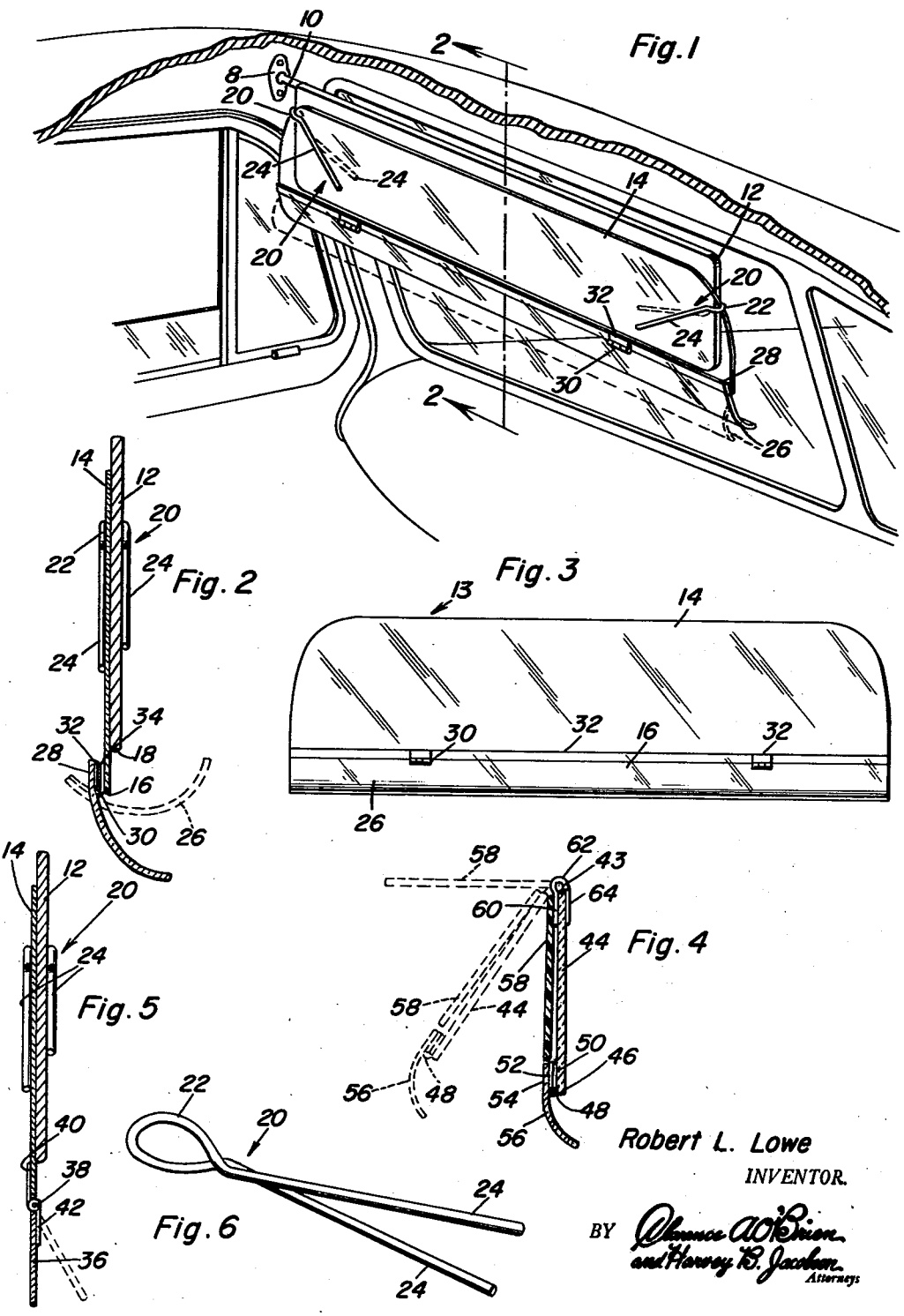
Robert L. Lowe
INVENTOR.

2,795,457

AUXILIARY VISOR FOR VEHICLES

Robert L. Lowe, Detroit, Mich.

Application January 26, 1955, Serial No. 484,100

1 Claim. (Cl. 296—97)

The present invention relates to motor vehicle antiglare shields, generally speaking, and has reference in particular to special structural adaptations which may be descriptively construed as automobile windshield visor means.

It is a matter of common knowledge that many and varied styles and forms of interceptors of natural and artificial lights and rays have been offered in an effort to promote safe driving by minimizing disastrous effects of dazzling and blinding rays especially and insofar as vehicle drivers are concerned. Perhaps, the most common type is the so-called sun visor which is virtually standard equipment on all present day automobiles and equivalent vehicles. In addition, there are ever so many plastic antiglare shields in use. The subject matter of the instant invention is a type which has to do with both transparent and non-transparent visors and antiglare shields.

One phase of the over-all inventive concept has to do with a hingedly mounted angularly adjustable horizontally disposed antiglare interceptor generally of colored commercial plastics, and an adapter plate or equivalent attaching member therefor which may be superimposed against the rear side of the standard or regular sun visor and clipped or otherwise fastened thereon, the interceptor proper being disposed below the lower edge of the sun visor, so that the driver will have at his disposal the provisions of the sun visor and also the added use of the antiglare interceptor.

Another object of the invention has to do with an extension of the combination ideas just revealed and which, more specifically, has to do with a two-part transparent shield which is hingedly mounted and the combination therewith of a non-transparent shield which functions as the visor, both being hinged on a common shaft such as that which is ordinarily provided for the aforementioned conventional-type non-transparent sun visor.

Other objects, features and advantages will become more readily apparent from the following description and the accompanying sheet of illustrative drawings.

In the drawings, wherein like numerals are employed to designate like parts throughout the views:

Figure 1 is a fragmentary perspective view showing a portion of an automobile and windshield and illustrating the conventional-type sun visor and showing the attachment-type antiglare shield clipped thereon and therefore suspended thereby and usable in conjunction therewith.

Figure 2 is a section on the vertical line 2—2 of Figure 1 on an enlarged scale and illustrating the essential structural details and their manner of construction and cooperation.

Figure 3 is an elevational view of the antiglare shield by itself.

Figure 4 is a section similar to Figure 2 but showing a modification of the invention.

Figure 5 is a view also virtually the same as Figure 2 showing a slight modification, compared to that which is depicted in Figure 2.

Figure 6 is a perspective view of one of the hairpin-like attaching and retaining clips.

Reference is had first to Figures 1 to 3 wherein in Figure 1 the numeral 8 designates a bracket carrying a rod or arm 10 on which the usual swingable and adjustable non-transparent sun visor 12 is mounted. It is not necessary to go into details here because this type of a sun visor is old and well known. The purpose in showing it in these figures is to bring out the fact that the attachment, which is the subject matter of the invention here, is detachably mounted on the visor. This attachment is conveniently treated here as an antiglare shield in that its properties are transparent. The attachment as a unitary device is denoted in Figure 3 by the numeral 13. The adapter and attaching flap is denoted at 14. While this has been made of commercial plastics of appropriate grade and happens to be transparent, it is not necessarily transparent insofar as its primary function is concerned. That is to say, this part or adapter 14 is sufficiently large that it is superimposed against what may be called the rear side of the visor or as brought out in Figure 2. It is also sufficiently wide that the lower edge portion 16 thereof may depend below the lower edge 18 of the visor. Once it is applied it is held in place by the aforementioned oversize clothespin-like or hairpin-like spring metal attaching and retaining clips 20. Each comprises a springy eye 22 and suitably crossed limbs 24 which may be spread apart and caused to straddle the sun visor and adapter flap 14. Thus, provision is made here for the essential feature which happens to be the antiglare shield proper which is sometimes referred to as a light ray interceptor and which is here of horizontally elongated rectangular form and is denoted by the numeral 26. It is transversely curved and it has an edge portion 28 overlapping the depending lower edge portions 16 of the attaching flap. This is accomplished through the medium of an appropriate hinge 30 having one leaf 32 secured to the antiglare shield and the other leaf 34 secured to the lower end portion of the attaching flap or adapter 14. With this antiglare shield on the visor it will be seen that the visor will perform in its usual manner. However, the glare shield will come into the picture whenever it is thought necessary or advisable to employ it and it may be swung forwardly or rearwardly so as to effectively intercept sun rays or artificial light rays as those which emanate from headlights of oncoming vehicles.

Actually, the form of the invention which is seen in Figure 5 is somewhat the same as that which has already been described and, in fact, the only difference is in the glare shield which is here denoted by the numeral 36 and which is flat instead of being curved. Also, the hinge 38 is slightly different with the leaves 40 and 42 arranged and attached in the manner illustrated. Structurally and functionally this is a construction equivalent to that seen in Figure 2. Except for the slight variations just mentioned, that which appears in Figure 5 is otherwise the same as that which is disclosed in Figure 2 and therefore corresponding numerals are applied to the corresponding or common parts in the belief that this will enable the reader to ascertain the similarities and dissimilarities involved.

In the modification shown in Figure 4, the relatively stationary support arm or rod is denoted by the numeral 43 and there are two components supported thereon. The larger transparent part 44 is a transparent antiglare shield and on the lower edge portion 46 hinge means 48 is provided embodying hinge leaves 50 and 52 providing a connection between the upper edge portion 54 and lower edge portion of the main antiglare shield 44 and its curvate auxiliary complement 56. These parts are comparable to a certain extent to the similar components 14 and 26 in Figures 1 to 3 inclusive with the hinge means. In the first three figures, the part 14, even though it is transparent, is primarily an attaching flap and does not serve to intercept light rays. In Figure 4, however, 44 is the main shield and 56 is the auxiliary shield. In this combination there is also another shield 58 and this one is of rubber or equivalent stock and is rigid and non-transparent. It is, in effect, like the sun visor. It is back of and opposed to the rear side of the main anti-glare shield 44. It has hinge leaves 60 connected thereto with knuckle portions 62 hinged on the rod 43. The other hinge leaf, or leaves 64 is connected with the transparent antiglare shield 44. Thus, these two shields may be moved apart as shown in dotted lines at the top in Figure 4, or they too may be swung back and forth while they are close together. Alternatively, 58 may be swung toward and from 44 to permit a certain amount of light to pass through the respective lower portions of 44 and 56. So, this one represents a versatile combination non-transparent and transparent shield, or shield and visor construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

In combination, a relatively stationary support rod, a non-transparent sun visor hingedly mounted on said rod and adapted to be adjusted toward and from a windshield to bring it wholly or partly in the line of vision of a driver, a transparent flap superimposed against one side of said visor, separate clips securing said flap adjustably and detachably on the sun visor, and a transparent anti-glare shield of elongated rectangular form hingedly mounted on the lower edge portion of said flap, said anti-glare shield being transversely curved in cross-section, the upper edge portion thereof being opposed to the lower edge portion of said flap and being hinged to said lower edge portion.

References Cited in the file of this patent

UNITED STATES PATENTS

| 1,600,201 | Reed | Sept. 14, 1926 |
| 2,106,889 | Frank | Feb. 1, 1938 |
| 2,118,198 | Hathaway | May 24, 1938 |
| 2,143,134 | Thacher | Jan. 10, 1939 |
| 2,231,641 | Schwab | Feb. 11, 1941 |
| 2,257,612 | Lininger | Sept. 30, 1941 |
| 2,596,397 | Greig et al. | May 13, 1952 |

FOREIGN PATENTS

| 366,577 | Italy | Jan. 2, 1939 |